United States Patent [19]

Marino et al.

[11] Patent Number: 4,953,267
[45] Date of Patent: Sep. 4, 1990

[54] MALE ELEMENT FOR HEAVY DUTY SNAP FASTENER

[76] Inventors: John G. Marino, 12 Sandra Ct., Huntington, N.Y. 11746; Michael Topputo, 18 Meadowbrook Dr., Brentwood, N.Y. 11717

[21] Appl. No.: 330,568

[22] Filed: Mar. 29, 1989

[51] Int. Cl.$^5$ .............................................. A44B 1/18
[52] U.S. Cl. ........................................ 24/682; 24/694
[58] Field of Search ................ 24/682, 694, 697, 683, 24/586, 90, 104; 340/426, 568, 572

[56] References Cited

U.S. PATENT DOCUMENTS

| 2,681,716 | 6/1954 | Black .................................... 24/694 |
| 3,512,226 | 5/1970 | Carlile .................................. 24/694 |
| 4,137,521 | 1/1979 | Martinez ............................. 340/426 |
| 4,144,794 | 3/1979 | Silverman et al. ..................... 24/694 |
| 4,253,084 | 2/1981 | Topputo .............................. 340/426 |
| 4,497,093 | 2/1985 | Haberkorn ........................... 24/697 |
| 4,610,120 | 9/1986 | Canavesi et al. ..................... 24/586 |

FOREIGN PATENT DOCUMENTS

| 0438306 | 5/1912 | France ................................... 24/694 |
| 0914137 | 12/1962 | United Kingdom .................. 24/694 |

Primary Examiner—Victor N. Sakran
Attorney, Agent, or Firm—Browdy and Neimark

[57] ABSTRACT

An improved snap fastener comprises a male element formed unitary with a mounting plate of plastic, and having at least three openings extending therethrough, the three openings being adapted to receive screws therethrough for fixedly mounting the male members/base plate solidly to the surface to which it is attached.

2 Claims, 1 Drawing Sheet

MALE ELEMENT FOR HEAVY DUTY SNAP FASTENER

FIELD OF INVENTION

The present invention relates to an improved heavy duty fastening element, and more especially to an improved male snap fastener element for use in heavy duty environments and especially for use in conjunction with the snap switch alarm of U.S. Patent No. 4,253,084.

BACKGROUND OF THE INVENTION

Many automobile and boat owners are plagued with the problem of the unauthorized intrusion of their vehicles. Owners whose vehicles have soft coverings such as canvas have increased problems since intrusion is easy. Boat owners especially have large amounts of expensive equipment that is presently secured only by a canvas cover that readily snaps and unsnaps.

The Topputo U.S. Pat. No. 4,253,084 solves the aforementioned problem by providing an alarm system which is actuated by the unfastening of the snap fastener used on protective coverings such as in automobiles and boats. However, in many cases it is desirable to use only a few of the snap switch alarm type-snaps of the Topputo U.S. Pat. No. '084, and to use conventional snap fasteners for the remainder, in order to reduce the overall expense. Two problems occur when this is done. First, a clever thief can lift up the edge of the canvas cover to see the base of the male snap element, and can thus tell the difference between a conventional snap fastener, which can then be attacked without fear of giving an alarm, and the snap sWitch alarm of the Topputo U.S. Pat. No. '084, which has a radically different base.

In practice, the Topputo device is believed to have been sold more than one year ago in an integrally molded form with the stud projecting upwardly from one surface of the mounting plate and the button switch casing projecting downwardly from the opposite bottom face of the mounting plate. This construction requires that a hole be drilled in the surface on which the device is mounted, such hole being capable of receiving the push button switch and its housing. This further increases the cost.

A second problem lies in the very nature of the conventional snap fastener. Often, these are insufficiently mounted and the male element may pull out of its mounting, especially if it has been subjected to weathering such as occurs in a marine environment. Thus, the conventional male element is mounted with only one screw directly to its center, and this male element will pull right out of whatever it is screwed into; the marine environment causes its metal structure to break down, often causing swelling with oxidation, and this further facilitates its tendency to pull out.

SUMMARY OF THE INVENTION

It is an object of the present invention to overcome deficiencies of the prior art, such as indicated above.

It is another object of the present invention to improve security relative to the fastening of a covering for an automobile or boat.

It is a further object of the present invention to provide an improved male element of a snap fastener.

It is still a further object of the present invention to provide a male element of a snap fastener which has improved anchoring characteristics.

It is yet another object of the present invention to provide a male element of a snap fastener which simulates the appearance of the snap switch alarm of the Topputo U.S. Pat. No. '084, and which can be used in conjunction therewith on the covering for an automobile or boat.

These and other objects of the invention are achieved by the provision of a male snap fastener element formed of plastic integral with an extended support base and retained in place by at least three fixing elements.

BRIEF DESCRIPTION OF DRAWING

The above and other objects and the nature and advantages of the present invention will be more apparent from the following detailed of an embodiment thereof, taking in conjunction drawing wherein.

DETAILED DESCRIPTION OF PREFERRED EMBODIMENTS

Figure 1:
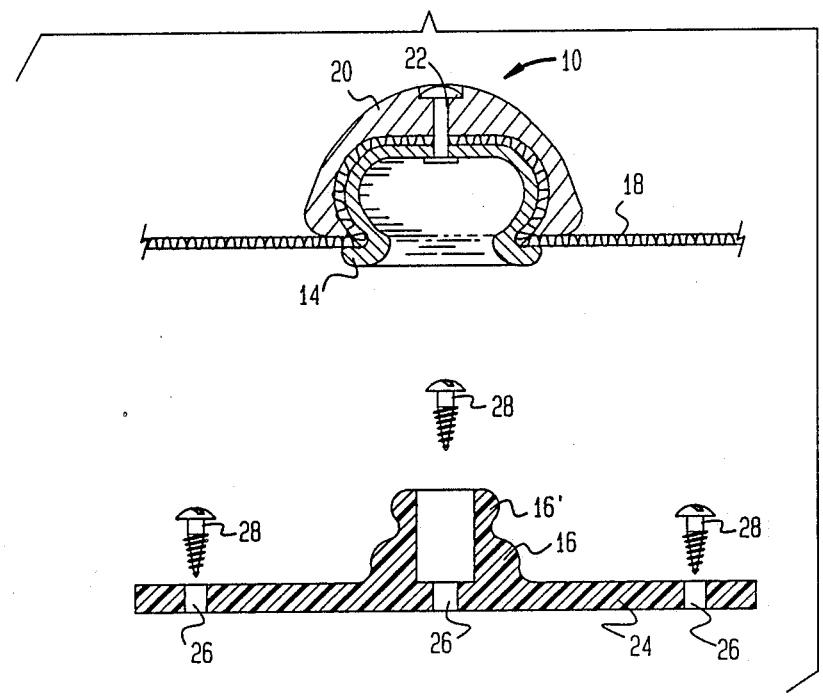
FIG. 1 is an exploded sectional view of a snap fastener in accordance with present invention.
Figure 2:
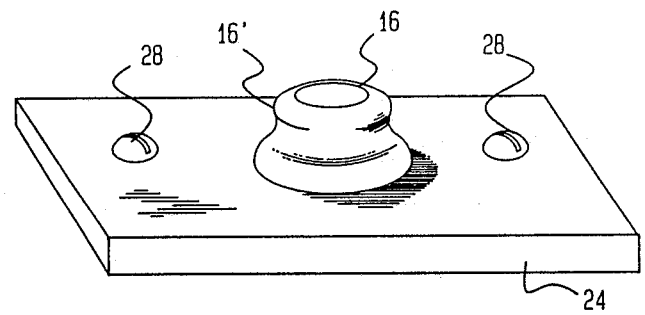
FIG. 2. is perspective of the novel male element thereof of the present invention.

A snap fastener in accordance with the present invention comprises a conventional female element 10 and a novel male element 12 which in use snap together in a way which will be readily apparent to those of normal skill in the art. The female member 10 is an assembly of three parts, namely an interior element 14 shaped internally to fit around the stud part 16 of the male element 12, and to be held in position by the locking action of the ridge 16' extending around the stud 16. A cover material 18, such as canvas or a canvas substitute, is inserted between the interior element 14 and an exterior element 20. The interior element 14 and the exterior element 20 are then held together by means of a rivet 22.

The novel male element 12 of the present invention is preferably integrally molded of a weather-resistant and preferably slippery or self-lubricating plastic such as polyprophylene, polyethylene, polytetrafluroethylene, nylon or the like. Such a male element may be easily injection molded in a single piece, including the stud portion 16 and an elongated flat-bottomed base portion 24. The base portion 24 is provided with three screw holes 26, each being adapted to receive a fastening element such as a screw 28 therethrough in order to reliably fix the male element 12 to the surface to which it is intended that it be fixed. The center hole 26 extends through the center of the stud 16.

It is to be understood that the present invention is suitable for every type of covering, but most preferably for the flexible coverings and more particularly canvas covers or the like for boats, automobiles and similar covering functions. In particular, the snap fastener of the present invention may be alternated with the snap switch alarm of the aforementioned Topputo U.S. Pat. '084 in a given regular or irregular pattern.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A snap fastener and support assembly comprising:
   (a) a generally circular male member and a generally circular female member adapted to releasably interlock with one another;
   (b) an elongated base plate adapted for mounting the male member of the snap fastener, said base plate being integral and unitary with said generally circular male member;
   (c) said base plate having a generally planar bottom surface;
   (d) said integral base plate and male member being formed of a generally weather-resistant and slippery plastic;
   (e) said integral male member and base plate having mounting means for mounting said base plate and male member to a support surface, said mounting means comprising two openings passing through said base plate and a third opening passing through said male member, and three screws or the like extending through said three openings; and
   (f) a vehicle cover mounted in combination with the female member whereby the female member is fastened over the male member when the cover is in position.

2. A vehicle cover comprising a soft and flexible covering such as canvas or the like, having a plurality of snap fasteners along its periphery, the improvement wherein:

some of said snap fasteners comprise snap switch alarm fasteners; and
   the remainder of said snap fasteners each comprise:
   (a) a generally circular male member and a generally circular female member adapted to releasably interlock with one another;
   (b) an elongated base plate adapted for mounting the male member of the snap fastener, said base plate being integral and unitary with said generally circular male member;
   (c) said base plate having a generally planar bottom surface;
   (d) said integral base plate and male member being formed of a generally weather-resistant and slippery plastic; and
   (e) said integral male member and base plate having mounting means for mounting said base plate and male member to a support surface, said mounting means comprising two openings passing through said base plate and a third opening passing through said male member, and three screws or the like extending through said three openings.

* * * * *